United States Patent [19]

Matyasi et al.

[11] 4,335,082

[45] Jun. 15, 1982

[54] METHOD OF DECREASING THE ORGANIC SUBSTANCE CONTENT OF ALUM EARTH PRODUCTION CYCLE PERFORMED ACCORDING TO THE BAYER TECHNOLOGY

[75] Inventors: József Matyasi, Budapest; Ferenc Toth, Almasfuzito-felso; Laszló Révész, Almasfuzito-felso; Benjaminne Toth, Almasfuzito-felso; Miklos Schlegel, Tata; József Zóldi, Budapest; Janosne Losonczi, Tata; Lajós Szóke, Almasfuzito-felso; Maria Orbán née Kelemen, Budapest, all of Hungary

[73] Assignee: Magyar Aluminiumipari Troszt, Budapest, Hungary

[21] Appl. No.: 201,722

[22] Filed: Oct. 29, 1980

[30] Foreign Application Priority Data

Oct. 30, 1979 [HU] Hungary .............................. AA 940

[51] Int. Cl.³ ............................. C01F 7/06; C01F 7/46
[52] U.S. Cl. .................................... 423/122; 423/121; 423/130
[58] Field of Search ............... 423/121, 130, 122, 124, 423/119

[56] References Cited

U.S. PATENT DOCUMENTS 2,522,605  9/1950  Cundiff ................................ 423/121
2,806,766  9/1957  Anderson .
3,120,996  2/1964  Porter ................................. 423/121
3,210,155  10/1965  Cagnolatti et al. .................. 423/121
4,046,855  9/1977  Schepers et al. ..................... 423/121

FOREIGN PATENT DOCUMENTS 2415872  10/1974  Fed. Rep. of Germany ...... 423/130

Primary Examiner—Herbert T. Carter
Attorney, Agent, or Firm—Young & Thompson

[57] ABSTRACT

The invention relates to a new method of reducing the organic substance content of alum earth production cycle performed according to the Bayer technology. By the method of the invention the majority of the organic substances present in the circulating lye can be removed easily and with only slight losses in sodium content.

According to the invention one proceeds so that soda present in the hydrate wash and/or in the soda salt solution is caustified with lime, the solution is evaporated to reach a total sodium oxide concentration of 200 to 400 g/l, the precipitated solid is separated and removed from the system, and the liquid is recycled.

5 Claims, No Drawings

METHOD OF DECREASING THE ORGANIC SUBSTANCE CONTENT OF ALUM EARTH PRODUCTION CYCLE PERFORMED ACCORDING TO THE BAYER TECHNOLOGY

The invention relates to a new method of decreasing the organic substance content of the alum earth production cycle performed according to the Bayer technology.

The term "Bayer cycle" as applied in the specification and claims refers to both the "American" and "European" methods of alum earth production according to the Bayer technology. The term "aluminate lye" (or briefly lye) refers to the circulated liquid, whereas the term "hydrate wash" refers to the liquid obtained after the washing of the alum earh hydrate. The term "soda salt" covers the solid substance, consisting mainly of sodium carbonate, separated from the evaporated lye by precipitation prior to recycling the lye into the leaching step, whereas the aqueous solution of this soda salt is termed as "soda salt solution". The term "organic cake" refers to the solid removed from the cycle according to the invention, which contains the organic impurities. The other terms applied in the specification and claims have the meaning commonly applied in the alum earth industry.

It is know that when bauxite is leached with sodium aluminate solution in the alum earth production according to the Bayer technology, about 60 to 70% of the organic substances, which comprise about 0.05 to 0.15% by weight of the bauxite, get dissolved in the aluminate lye. Only a minor proportion of dissolved organic substances leaves the system by adsorption onto the red mud and the washed alum earth hydrate, the major part circulates in the system owing to the cyclic nature of the process. The amount of dissolved organic substances gradually increases, and may reach a limit where serious and hardly avoidable technological malfunctions appear in addition to the steadily present disadvantages caused by the organic substances. A commonly applied counter-measure is the removal of the soda salt and the hydrate wash, both containing large amounts of organic substances, at this stage, which involves, however, serious losses in caustic soda.

Of the technological difficulties caused by the organic substances foaming, difficulties arising upon the separation of soda salt and other ballast substances, problems emerging upon the evaporation of the lye, as well as deterioration of the sedimenting properties of red mud were primarily emphasized in the 1960's, and less attention was paid to the disadvantageous effects on the precipitation step. Studies dealing with the effects of some organic fractions on precipitation were published first at the beginning of the 1970's. It was found that a great proportion of the organic substances present becomes adsorbed on the surface of alum earth hydrate or separates together with aluminium hydroxide, which involves several disadvantages, such as a decrease in the active surface of the noduli, retardation of the precipitation of alum earth hydrate, decrease in efficiency, reduction of the particle size of the precipitated solid and worsening of the filterability of the hydrate. The organic substances also increase the sodium oxide content of alum earth, since the individual organic fractions are adsorbed as sodium salts on the insufficiently washed hydrate to be calcined in the subsequent step.

Several methods have so far been elaborated for removing organic substances or decreasing their amounts in the cycle.

According to one of these methods the ballast salts are removed by increasing the local sodium concentration and heat treating the aluminate lye at 150° to 250° C., thereby eliminating the technological problems caused by the simultaneous increase in the levels of soda and organic substances (Hungarian Pat. No. 146,023; U.S. Pat. No. 2,306,766). In this process the organic substances are destroyed, and an easily filterable crystalline salt is formed. The removal of this substance substantially decreases the salt level of the cycle, and a part of the organic substances is removed as well.

According to other methods, bauxite is roasted or washed with an aqeuous or organic solvent in order to remove the organic substances.

Several methods are based on the removal of the organic substances by adsorption. In these methods activated carbon, lime and ion exchange resins are used as adsorbent.

The problems caused by the presence of organic substances can also be reduced by destroying the organic substances with an oxidizing agent, such as sodium hypochlorite, chlorine gas, potassium permanganate or oxygen at high temperatures and superatmospheric pressures.

According to the most recent method, precipitation with sodium oxalate is used to decrease the organic substance content, making use of the poor solubility of sodium oxalate (U.S. Pat. No. 3,899,571). The lye obtained after precipitating alum earth hydrate is seeded with large crystals of sodium oxalate and then stirred to precipitate the oxalates. A part of the oxalate separated is used as seed in further separation cycles.

The common disadvantages of these known methods are that they generally run with great sodium losses, and the majority of them is difficult to perform and requires expensive apparatuses.

Now we have found that the organic substances present in the lye of the Bayer cycle can be removed much more simply than before and with a very low sodium loss when soda present in the hydrate wash and/or in the soda salt solution is caustified with lime, the solution is evaporated to reach a total sodium oxide ($Na_2O$) concentration of 200 to 400 g/l, the precipitated solid is separated and removed from the system, and the liquid is recycled.

The invention is based on the recognition that the organic substances accumulated in relatively large amounts in the hydrate can be removed most easily from the hydrate wash obtained in the washing of alum earth hydrate. The efficiency of removal can be increased further by also processing the soda salt solution, i.e. the aqueous solution of the soda salt precipitated from the evaporated lye. Both starting materials contain, however, large amounts of sodium carbonate, which would cause problems in the evaporation step, since the evaporator tubes would become plugged and the soda salt and organic substances, precipitating simultaneously, would be difficult to separate. Therefore, according to the process of the invention, the soda content of the starting material is caustified before evaporation.

It has also been found that not only the amount of oxalates but also the amount of humates, which are more difficult to remove, can be decreased by the process of the invention.

Data characterizing the efficiency of the new method are disclosed in the following tables by giving the amount and compositions of the so-called organic cake. The data of Tables 1 to 3 also indicate that both the amount and the distribution of the organic substances removed vary as a function of the final sodium concentration (expressed as sodium oxide) of the evaporated solution.

TABLE 1

Quantitative and qualitative distribution of organic substances in the organic cake

|  | Sample number | | |
|---|---|---|---|
| Final concentration after | I/9 | I/6 | I/5 |
| evaporation (tNa$_2$O g/l)* | 290 | 300 | 330 |
| Total carbon content, % | | | |
| (related to the dry weight | | | |
| of the cake) | 10.5 | 10.0 | 6.14 |
| Distribution: | | | |
| Oxalate, % | 90.6 | 90.4 | 76.7 |
| Formate, % | 7.9 | 8.3 | 7.4 |
| Acetate, % | 3.4 | 9.2 | 8.5 |
| Humate, % | 0.3 | 0.4 | 0.5 |

TABLE 2

Qualitative and quantitative distribution of organic substances in the organic cake

| Final concentration | Sample | | | |
|---|---|---|---|---|
| after evaporation | A | B | C | D |
| (tNa$_2$O g/l)* | 254 | 289 | 316 | 435 |
| Total carbon content, % | | | | |
| (related to the dry | | | | |
| weight of the cake) | 14.7 | 9.66 | 8.72 | 4.25 |
| Distribution: | | | | |
| Oxalate, % | 98 | 86 | 74 | 67 |
| Formate, % | 0.3 | 0.4 | 2.8 | 4.5 |
| Acetate, % | 0.1 | 1.6 | 6.0 | 7.6 |
| Humate, % | 2.3 | 3.5 | 4.7 | 5.1 |
| Others, % | 0.0 | 0.0 | 0.5 | 0.6 |

*tNa$_2$O = total sodium content, expressed as sodium oxide

TABLE 3

Quantitative and qualitative distribution of the organic substance content of soda salt separated from a highly concentrated lye

| Organic substances | Total sodium content of the evaporated lye (tNa$_2$O g/l) | | | |
|---|---|---|---|---|
| present | 310 | 330 | 340 | 330 |
| Humate, % | 3.1 | 4.7 | 6.3 | 7.3 |
| Formate, % | 14.0 | 14.1 | 14.3 | 20.0 |
| Acetate, % | 24.1 | 27.2 | 23.9 | 17.0 |
| Oxalate, % | 9.0 | 9.3 | 11.0 | 11.6 |
| Succinate, % | 8.1 | 8.4 | 6.3 | 5.5 |
| Glutamate, % | 1.6 | 1.6 | 1.2 | 1.0 |
| Salt of benzene-tri- | | | | |
| carboxylic acid, % | 4.1 | 4.4 | 3.4 | 3.1 |
| Salt of isovaleric | | | | |
| acid, % | 1.6 | 2.3 | 2.1 | 1.5 |

The process of the invention can also be performed so that, depending on the technological conditions, only the hydrate wash or only the soda salt solution is processed. It is preferred, however, to process both hydrate wash and soda salt solution.

Soda present in the starting material is caustified with lime in a manner well known to those skilled in the art. Lime is applied generally in a small excess, it may sometimes be advantageous, however, to caustify only with the stoichiometric amount of lime.

The precipitate formed in caustification is removed, and the resulting solution is concentrated to a total sodium oxide content of 200 to 400 g/l. The solution is concentrated preferably to a total sodium oxide content of 240 to 320 g/l. When hydrate wash is processed, the most preferred concentration lies within the range of 290 to 300 g/l.

According to a preferred method of the invention the starting solution is treated with lime for 1 to 3 hours at 70° to 100° C., under intense stirring. Generally 10 to 30 g/l of lime are added to the solution. Thereafter the separated solid (the so-called white mud) is removed when hot. If desired, white mud can be utilized in the production cycle e.g. by feeding it to the red mud washing line.

The resulting solution is then evaporated until the concentration mentioned above is reached. The precipitated solid substance, which contains the organic impurities to be removed, is separated from the liquid e.g. by centrifuging, sedimenting and/or filtering. The separated solid substances (the so-called organic cake) is discarded, and the liquid is recycled.

The process of the invention is easy to perform and requires no specific equipment. The process can be conducted in the conventional apparatuses applied in alum earth plants.

A further advantage of the new process is that, as a result of caustification, a substantial amount of sodium which would otherwise be lost may be retained in the cycle. As an additional advantage, soda salt and the organic impurities can be separated from each other by the process of the invention.

The invention is elucidated in detail by the aid of the following non-limiting Examples.

EXAMPLE 1

Hydrate wash arising from the plant was caustified with about 20 g/l of lime for 2 hours at 90° C., under intense stirring. The analytical data of the hydrate wash, determined before and after caustification, are listed in Table 4. The data of Table 4 indicate that the organic carbon content (C, g/l) of the lye also decreased somewhat upon caustification.

TABLE 4

Analytical data of hydrate wash

| Analyzed components | Before caustification | After caustification |
|---|---|---|
| total Na$_2$O, g/l | 51.2 | 54.9 |
| caustic Na$_2$O, g/l | 41.6 | 47.0 |
| C, g/l | 2.53 | 2.43 |

Samples of the hydrate wash obtained after caustification were evaporated to the final concentrations listed in Table 5. The solids separated upon evaporation were filtered off, and their organic carbon contents were determined. The measured values and the analytical data of the filtered lye are listed in Table 5.

On the basis of the plant parameters of the alum earth production cycle, we have calculated the amount of organic substances removed from the cycle by the process of the invention, and expressed it in terms of kg of organic carbon (C)/tons of alum earth. The analytical data of the organic cakes obtained in tests I/9, I/6 and I/5 are presented in Table 1. It will be seen from the data of Table 5 that a cake with maximum organic substance content is obtained when the liquid is evaporated to a final total sodium oxide content of 290 to 300 g/l. This is even clearer from the data of the test series performed according to Example 2, where the other analytical data of the organic cakes are also presented.

EXAMPLE 2

Hydrate wash arising from the plant was caustified with about 20 g/l of lime for 2 hours at 90° C., under intense stirring. The analytical data of the starting hydrate wash before caustification and those of the caustified hydrate wash samples utilized in the subsequent evaporation tests are given in Table 6. The analytical data of the organic cakes separated from the caustified hydrate wash after evaporating it to a pre-determined concentration, as well as those to the filtrate are listed in Table 7.

Considering the $CO_2$ and $Al_2O_3$ contents of the organic cakes obtained in the individual tests, it appears that the most favourable concentration range to be attained in the evaporation step is between 290 and 300 g/l, since the organic cake which separates from this concentrate still contains high amounts of organic substances, whereas the amounts of separated soda and aluminium oxide are still low. Thus an optimum final concentration with respect to the other losses can be determined; nevertheless the final concentration required to attain separation of the organic substances is always a function of the qualitative and quantitative distribution of the organic substances present in the cycle.

TABLE 6-continued

| | Analytical data of hydrate wash | | | | | | | |
|---|---|---|---|---|---|---|---|---|
| Analyzed components | Before caustification | After caustification | | | | | | |
| | | II/3 | II/2 | II/5 | II/8 | II/1 | II/13 | II/9 |
| $Na_2O$, g/l caustic | 46.1 | 51.5 | 49.6 | 50.8 | 49.6 | 50.8 | 52.7 | 51.5 |
| $Na_2O$, g/l organic | 39.6 | 44.6 | 45.7 | 45.7 | 44.8 | 45.1 | 48.8 | 45.3 |
| carbon, g/l | 2.37 | 2.01 | 2.17 | 2.17 | 1.98 | 2.50 | 1.87 | 2.08 |

TABLE 7

Evaporation of caustified hydrate wash to different final sodium concentrations (t$Na_2O$)

| | Sample number | | | | | | |
|---|---|---|---|---|---|---|---|
| Final sodium concentration attained (t$Na_2O$, g/l) | II/3 250 | II/2 280 | II/5 290 | II/8 300 | II/1 330 | II/13 360 | II/9 380 |
| Analytical data of the filtrate obtained after removing the solids from the evaporated lye | | | | | | | |
| total $Na_2O$, g/l | 254.4 | 282.1 | 294.5 | 305.4 | 330.1 | 359.6 | 381.3 |
| caustic $Na_2O$, g/l | 228.8 | 232.0 | 260.8 | 280.0 | 305.6 | 312.0 | 368.0 |
| $Al_2O_3$, g/l | 38.2 | 42.8 | 50.0 | 52.8 | 58.9 | 53.0 | 71.1 |
| organic carbon (C), g/l | 8.1 | 8.2 | 8.6 | 8.0 | 9.0 | 8.3 | 10.2 |
| Analytical data of the organic cake filtered off after evaporation | | | | | | | |
| organic carbon (C), % | 9.6 | 8.2 | 10.7 | 4.8 | 6.6 | 4.9 | 3.3 |
| $CO_2$, % | 1.7 | 1.9 | 1.95 | 5.0 | 7.3 | 6.1 | 6.2 |
| $Al_2O_3$, % | — | 0.9 | 1.1 | 3.9 | 3.5 | 4.4 | 6.0 |
| Amount of organic carbon (C) removed from the cycle, kg/ton of alum earth | 0.45 | 0.87 | 0.83 | 0.81 | 1.34 | 0.78 | 0.84 |

EXAMPLE 3

An alkaline salt solution was prepared by using industrial water from soda salt precipitated from evaporated (to 280–300 g/l of c. $Na_2O$ content) lye, the analytical data of which are listed in Table 8.

TABLE 8

| c. $Na_2O$ | g/l: | 32.0 |
|---|---|---|
| $Na_2CO_3$ | g/l: | 23.0 |
| $Na_2CO_3$ | %: | 27.1 |
| C | g/l: | 1.6 |

This salt solution with high carbonate content was caustified with about 15–20 g/l of lime for 2 hours at 90° C., under intense stirring. The analytical data of the filtrate obtained from the caustification are listed in Table 9.

TABLE 9

| c. $Na_2O$ | g/l: | 44.3 |
|---|---|---|
| $Na_2CO_3$ | g/l: | 8.0 |

TABLE 5

Evaporation of caustified hydrate wash to different final sodium concentrations (t$Na_2O$)

| | Sample number | | | | | | | |
|---|---|---|---|---|---|---|---|---|
| Final sodium concentration attained (t$Na_2O$, g/l) | I/2 220 | I/7 240 | I/11 270 | I/9 290 | I/6 300 | I/10 310 | I/5 330 | I/3 370 |
| Analytical data of the filtrate obtained after removing the solids from the evaporated lye | | | | | | | | |
| total $Na_2O$, g/l | 217.0 | 237.1 | 269.7 | 286.7 | 299.1 | 310.0 | 334.8 | 367.3 |
| caustic $Na_2O$, g/l | 197.6 | 206.4 | 247.2 | 262.4 | 267.2 | 263.6 | 302.4 | 347.2 |
| $Al_2O_3$, g/l | 31.4 | 31.6 | 36.1 | 38.0 | 41.3 | 42.8 | 50.3 | 52.8 |
| organic carbon (C), g/l | 7.6 | 6.6 | 7.9 | 8.3 | 8.3 | 9.1 | 9.3 | 10.0 |
| Organic carbon content of the organic cake filtered off, % (related to dry substance content) | 4.3 | 8.1 | 7.9 | 10.5 | 10.0 | 8.0 | 6.1 | 4.2 |
| Amount of organic carbon (C) removed from the cycle, kg/ton of alum earth | 0.6 | 1.08 | 0.97 | 1.01 | 1.08 | 0.98 | 1.09 | 1.12 |

TABLE 6

| | Analytical data of hydrate wash | | | | | | | |
|---|---|---|---|---|---|---|---|---|
| Analyzed components | Before caustification | After caustification | | | | | | |
| | | II/3 | II/2 | II/5 | II/8 | II/1 | II/13 | II/9 |
| total | | | | | | | | |

TABLE 9-continued

|  |  |  |
|---|---|---|
| $Na_2CO_3$ | %: | 8.6 |
| C | g/l: | 1.9 |

The filtrate thus obtained was evaporated to a total sodium oxide content of 290–300 g/l (Table 10).

TABLE 10

| c. | $Na_2O$ | g/l: | 300.4 |
|---|---|---|---|
|  | $Na_2CO_3$ | g/l: | 51.5 |
|  | $Na_2CO_3$ | %: | 8.7 |
|  | C | g/l: | 11.8 |

After sedimentation and filtration of the slurry obtained from the evaporation, the analytical data of the filtrate, which is free from organic substances, and of the filtered salt are listed in Table 11.

TABLE 11

|  |  |  | Filtrate | Salt |
|---|---|---|---|---|
| c. | $Na_2O$ | g/l: | 302.4 |  |
|  | $Na_2CO_3$ | g/l: | 34.7 |  |
|  | $Na_2CO_3$ | %: | 5.6 |  |
|  | C | g/l: | 7.0 | C %: 3.1 |

The amount of the organic substances specifically removable by this method depends on the amount of the soda salt actually precipitated from the system.

What we claim is:

1. A method of reducing the organic substance content of the alum earth produced in a Bayer cycle, comprising caustifying with lime the soda present in the hydrate wash and/or in the soda salt solution of said Bayer cycle, removing the resulting precipitate, evaporating the resulting liquid to a total sodium oxide concentration of 200 to 400 g/l, separating the precipitated solid containing the organic impurities and removing it from the system, and recycling the remaining liquid.

2. A method as claimed in claim 1, in which the hydrate wash is caustified.

3. A method as claimed in claim 1, in which the soda salt solution is caustified.

4. A method as claimed in claim 1, in which said evaporation is to a total sodium oxide content of 240 to 320 g/l.

5. A method as claimed in claim 1, in which said evaporation is a total sodium oxide content of 290 to 300 g/l.

* * * * *